Oct. 8, 1963　　　J. P. MICHALSKI　　　3,106,437
DETECTING AND CLASSIFYING BODIES ON AN OCEAN FLOOR
Filed Dec. 3, 1958　　　　　　　　　　　　　3 Sheets-Sheet 1

INVENTOR.
JOHN P. MICHALSKI
BY
ATTORNEYS

John P. Michalski
INVENTOR.

BY
ATTORNEYS

United States Patent Office 3,106,437
Patented Oct. 8, 1963

3,106,437
DETECTING AND CLASSIFYING BODIES ON AN OCEAN FLOOR
John P. Michalski, Panama City, Fla., assignor to the United States of America as represented by the Secretary of the Navy
Filed Dec. 3, 1958, Ser. No. 778,040
3 Claims. (Cl. 346—33)
(Granted under Title 35, U.S. Code (1952), sec. 266)

The invention described herein may be manufactured and used by or for the Government of the United States of America for governmental purposes without the payment of any royalties thereon or therefor.

The present invention relates to the detection of bodies on an ocean floor and more particularly to the detection, classification, and/or destruction of ground mines, i.e., mines lying on the bottom of a body of water.

In accordance with the invention a rake-like device having individually pivoted prongs or teeth is moved along the bottom so as to encounter any object lying proud thereon, the arrangement being that the prongs which pass over elevated objects are moved angularly about their pivots which movements by suitable mechanism are converted into corresponding electric signals which are employed to indicate the position and approximate size of the object encountered and/or to release a marker buoy or a time delay destructive charge.

The primary object of the invention is to provide a simple apparatus of robust construction for detecting mine-like objects on the ocean floor.

Another object of the invention is to provide detection apparatus which will indicate the approximate dimensions and orientation of an object proud of the ocean floor, i.e., in unburied condition.

Still another object of the invention is to provide detection apparatus which will furnish an electric signal only when the dimensions of a detected object fall within a preselected range of values.

A further object of the invention is the provision of apparatus which will buoy and/or destroy mine-like objects on the ocean floor.

Other objects as well as the advantages of the invention will become evident from the following description when read in connection with the accompanying drawing in which.

The apparatus to be described for the purpose of disclosing the invention has been designed to detect, classify, and/or buoy or destroy those objects, of which anti-ship ground mines are exemplary, which approximate the size and shape of the mines believed to be in the area.

Figure 3:
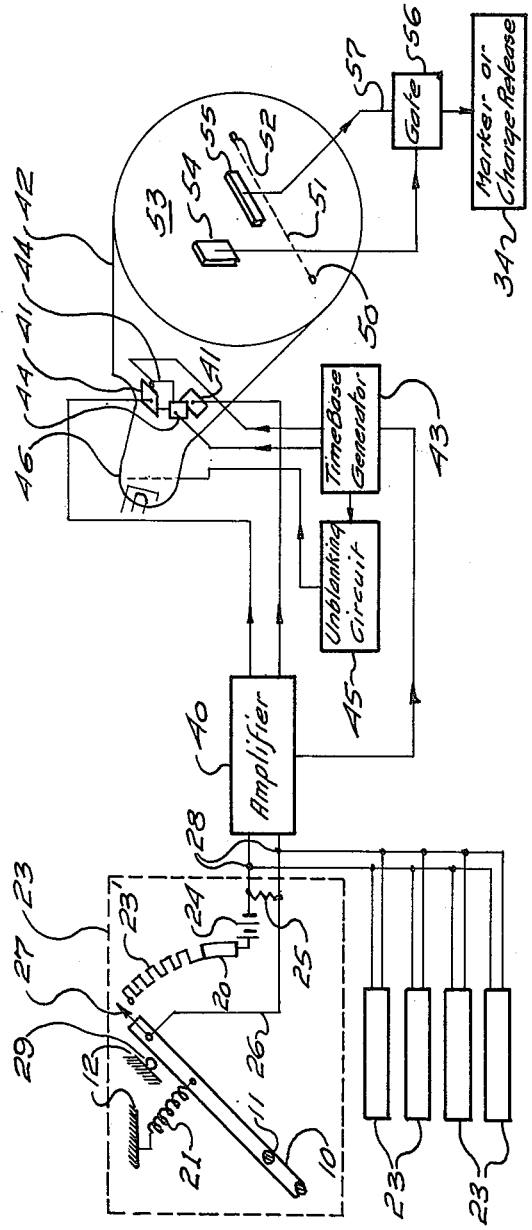
FIG. 3 is a conventionalized showing of an automatic embodiment of the invention.

There are a number of systems available for towing devices through a body of water at a fixed distance above the bottom, and the apparatus of the invention is functionally indifferent to the particular system employed. As here shown in FIG. 1 a plurality of tactile means in the form of relatively stiff rods 10 mutually parallel in a common plane are mounted for individual rotation about a common axis 11 and suitably supported in a faired body 12 comprising an elongated frame member which is supported the desired distance above and parallel to the sea bottom on sled runners 13 and supporting frames 14. The sled runners 13 have their forward ends 15 upturned for riding over obstacles and articulated at joints 16 for hinge action in the horizontal plane to facilitate turning. The sled is adapted to be moved along the ocean floor by a surface vessel 17 through a tow and electrical conductor line 18 and a bridle arrangement 19 secured to the upturned ends 15 of the runners 13. The rods 10 are spaced apart a distance somewhat less than the diameter of a mine. The individual rods 10 are suitably biased as by loading springs 21 (see FIG. 3) in a manner that will balance out the force caused by motion through the water tending to deflect the rods 10 from the sea bottom. When one or more of the rods 10 contact a bottom object 22 they are rotated against the bias of the springs 21 about the axis 11 by an amount and for a duration of time corresponding to the height and the length (in the direction of travel) of the object 22. Each of the rods 10 is connected to an individual device 23 whose impedance or other electrical characteristic is readily altered by the angular movement of its associated rod 10. As shown in FIG. 3 the device 23 comprises a resistance 23' having an elongated terminal 20 connected in series with a source of electric potential 24, a load resistor 25, a lead 26 and a contact 27 movable with the rod 10 in a path to first close the circuit through the resistance 23' and thereafter decrease the amount of the resistance 23' in the circuit as a function of the angular movement of the rod 10 about its pivot axis 11. It will be evident that with this arrangement a voltage is posted on terminals 28 whenever the contact 27 is in engagement with the resistance 23' and that this posted voltage is proportional to the angular position of the rod 10 on its axis 11. In its biased position determined by a stop boss 29 provided on the body 12 the rod 10 preferably positions the contact 27 an angular distance from the distal end of the resistance 23' such that small movements of the rod 10 caused by unevenness of the bottom or by objects much too small to be a mine will not bring the contact 27 into engagement with the resistance 23'. Similarly, objects much too large to be a mine will cause the contact 27 to ride on the elongated terminal 20 without increasing the signal voltage across the load resistor 25 beyond a desired maximum.

Inasmuch as each of the rods 10 has its own basic instrumentation 23 the signals generated by the deflection of the rods 10 can be individually recorded on a moving chart 31 (see FIG. 2) as by a multichannel recorder 32 in such form that an experienced observer can visualize the general shape, approximate size and orientation of the bottom object causing the deflection of the rods 10. The recording on the chart 31 shown in FIG. 2 indicates on its upper portion the presence of a cylindrical object having its axis making an angle of about 75° with the direction of travel, having a length somewhat greater than five times the spacing of the rods 10, and having a dimension in the direction of tow and a height which can be read off of calibration lines (not shown). The chart 31 should be moved at a rate correlated with the speed of tow.

The recording on the lower portion of the chart 31 indicates the presence of a sphere, or more accurately an object having a somewhat hemispherical upper portion, having a diameter slightly greater than twice the spacing between the rods 10. It is to be understood that these examples of a cylinder and a sphere are for purposes of explanation only since it is obvious that lines recorded on the chart 31 contain no information concerning the profile or contour of the portions of the objects not contacted by the rods 10.

Figure 1:
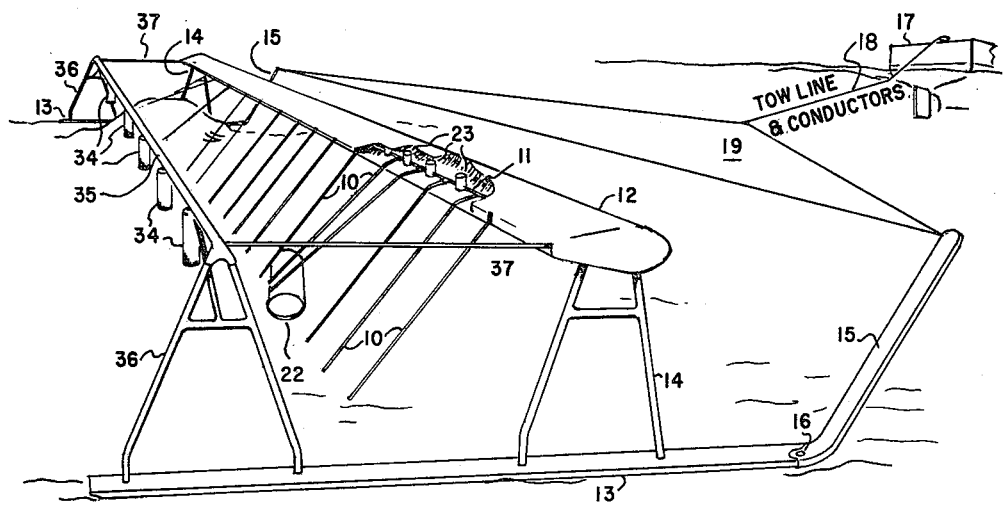
FIG. 1 is a view in perspective of an apparatus incorporating the invention.
Figure 2:
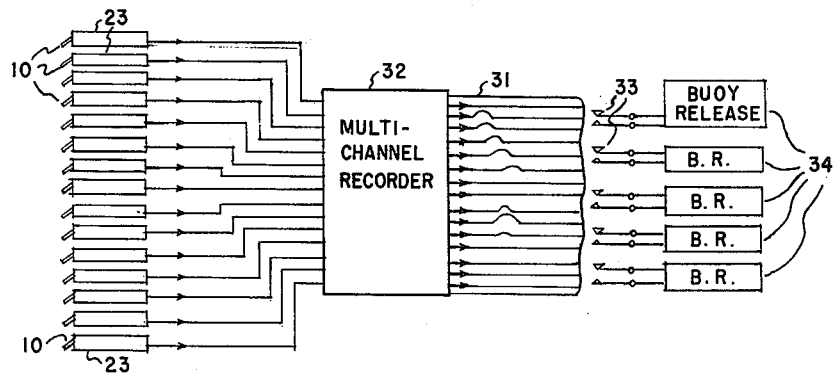
FIG. 2 shows diagrammatically a simple arrangement for use by an observer operator.

Conveniently associated with and preferably within the reach of an observer of the chart 31 are a plurality of hand operated switches 33 for separately and remotely controlling a plurality of devices 34 for releasing a marking device such as a buoy or destructive charge as is well known. As shown in FIG. 1 the marking or destructive devices 34 are carried in spaced relation on a transverse member 35 suitably supported by frameworks 36 mounted on the sled runners 13. The transverse member 35 is parallel to and to the rear of the body 12 with tie rods 37 connecting them for added rigidity. With the devices 34 thus carried to the rear of the detecting rods 10 it will be apparent that an observer watching the recording being made on the chart 31 can by pressing the proper switch 33 bring about the release of a device 34 in the immediate vicinity of the object whose presence has been indicated on the record chart 31. The ratio between the number of detecting rods 10 and the number of releasable devices 34 depends upon the accuracy of marking desired and is shown in FIG. 2 as being three, i.e., one releasable device for each group of three rods 10. This ratio is considered to be compatible with the obtainable accuracy in other parameters.

An arrangement for releasing automatically the marker or charge device 34 upon the detection of a suitably dimensioned object is shown in FIG. 3 wherein the signal voltage appearing on the terminals 23 is fed through an amplifier 40 to the vertical deflecting plates 41 of a cathode ray tube 42. The initial voltage pulse occurring when the contact 27 engages the resistance 23' is employed to trigger a time base generator 43 which applies an increasing voltage to the horizontal deflecting plates 44 of the cathode ray tube 42 and triggers an unblanking circuit 45 which furnishes a positive pulse to the grid 46 to turn on the beam of the cathode ray tube 42 for an interval equal to the time required for completion of one horizontal sweep of the beam. This time interval is selected and/or adjusted to be a known function of the speed of tow so that the horizontal trace will be meaningful.

The cathode ray of the tube 42 is biased to a reference point 50 in any well known manner as by aligning its various electrodes to cause the ray to be at the point 50 when no voltage is applied to the deflectors 41 and 44 or when the tube 42 has a centrally aligned ray or beam by applying to the deflectors 41 and 44 such bias voltages as are required to cause the ray to be at the point 50 when the time base generator 43 is at rest and no signal voltage is applied through the amplifier 40. When the time base generator 43 is turned on it generates an increasing voltage which moves the cathode ray from the reference point 50 along a horizontal path 51 to a point 52 determined by the adjustment of the time base generator, it being understood that the path 51 would be followed only if no signal voltage was applied to the vertical deflecting plate 41. The face of the cathode ray tube is preferably provided with a florescent screen 53 which emits light when excited by a cathode ray although the tube 42 may be a monoscope type of signal generator provided with secondary electron emissive material covering those areas where it is desired to sense the passage of the cathode ray for the purpose now to be described.

With the cathode ray tube 42 provided with a florescent screen 53 a first photoelectric cell 54 is positioned to receive light from only a small area of the screen 53, and a second photoelectric cell 55 is arranged to receive light from another selected small area of the screen 53. The respective areas covered by the cells 54 and 55 are designated 54' and 55' in FIG. 4. These areas 54' and 55' are so selected that both areas will be traversed by a sweep of the cathode ray only when the signal from the amplifier 40 falls within a preselected range of values. These values are chosen to include the expected range in dimensions of the mines being searched for. The cell 54 is connected to open for a suitable time interval a gate 56 whenever it senses the area 54' being traversed by the cathode ray. Whenever the cathode ray crosses the area 55' the cell 55 furnishes a signal on lead 57 to the gate 56, and if the gate 56 is open this signal passes to the marker or charge release mechanism 34 to cause it to release a marker or charge as desired. An inspection of FIG. 4 makes evident the desired selective action wherein the three curves A, B and C correspond to three different traces of the cathode ray. Curve A which passes above the area 54' but crosses the area 55' indicates that the object detected has a vertical dimension larger than that of any expected mine such as, for example, a large oil drum, curve B which passes through both of the areas 54' and 55' indicates that the object detected is within the range of dimensions previously determined to be mine-like, while curve C which intercepts only the area 55' indicates that the object detected has a vertical dimension less than that of an expected mine. It will be evident that of the three detected objects causing the respective traces A, B and C a marker or charge will be dropped by the release mechanism only for the object bringing about the trace B.

The operation of the apparatus of FIG. 3 will now be described. When any one of the signal producing devices 23 (here shown as a group of five) connected to the automatic release arrangement of FIG. 3 detects an object of sufficient height to cause the contact 27 to engage the resistance 23' the resulting initial voltage pulse triggers the time base generator 43 and the unblanking circuit 45 to establish a cathode ray beam in the tube 42, and simultaneously therewith the established beam moves from the reference point 50 to a height O (see FIG. 4) corresponding to the initial voltage appearing across the load resistor 25 and thereafter moves horizontally at a constant rate with its vertical position at all times subject to the control of the voltage across the resistance 25 and hence corresponding to the angular position of the rod 10 which in turn is dependent upon the vertical dimension of the object being detected. If the dimensions of the detected object are such as to cause the cathode ray to successively traverse the area 54' and 55' the photocell 54 will open the gate 56 and the photocell 55 will furnish a signal to the marker or charge release device 34. It is to be understood that any well known marking device such as an anchored buoy or a sound generator may be dropped by the release mechanism 34 or as is well known a destructive charge provided with a time delay detonator may be dropped by the release mechanism 34. It is also to be understood that the selective release mechanism of FIG. 3 will be employed with each successive group of rods 10 and their signal producing devices 23 and that the number of rods 10 grouped to a single release system is chosen to provide the desired accuracy of marking.

Figure 4:
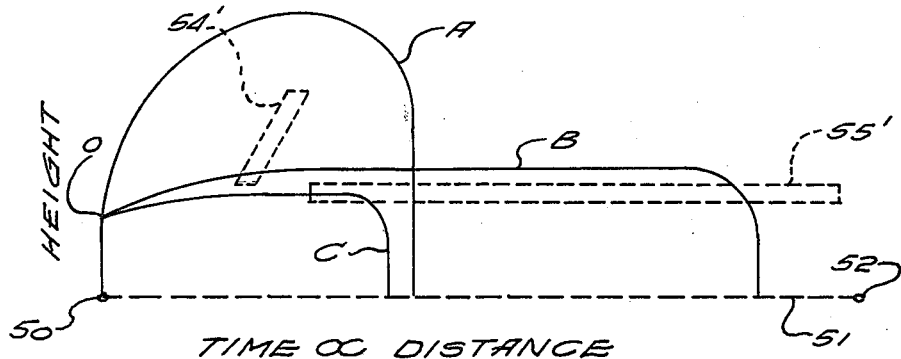
FIG. 4 is a curve showing the dimension recognizing feature of the apparatus of FIG. 3.

Although the arrangement just described in connection with FIGS. 3 and 4 provides useful selectivity in identifying mine-like objects, it cannot discriminate between a mine and a square platform having the height of a mine and each side having a length of the longest dimension of a mine. Additional discrimination in selecting mine-like objects is provided by the system shown in FIG. 5 wherein the voltages posted on the terminals 28 individual to the sensing devices 23 (only four being shown) are employed to charge a condenser 60 through individual resistances 61, the condenser 60 being preferably shunted by a bleeder resistance 62 the resistivity of which is very much larger than the resistance value of the resistances 61. The condenser 60 is chosen to have sufficient capacity so that in this use its voltage rise is substantially linear with current. The voltage on the condenser 60 is applied to the grids of two thyratron tubes 63 and 64 having their cathodes biased to different values by a voltage divider 65. The values for the resistances 61, the condenser 60 and the bias voltages on the tubes 63 and 64 are chosen and correlated so that the tube 63 will fire when a preselected minimum current has been charging the condenser 60 for a given unit of time, and the tube 64 will be fired if such charging continues for a selected interval beyond said given unit of time. When the tube 63 conducts it energizes the coil 66 of a time delay relay 67 which preferably is of the slow-make-fast-break type so that if its coil 66 is de-energized during its time delay the relay will immediately return to its original position. When the time delay relay 67 closes it completes the circuit for the marker release device 34 as and for the purpose hereinbefore described, and energizes the coil E of a relay 68 for the purpose of quenching the tube 63 and discharging the condenser 60. If during the time delay period of the relay 67 the tube 64 fires, the coil D of the relay 68 will be energized to open the anode circuit of the tube 63 to thereby de-energize the coil 66 of the relay 67 and to close contacts to short circuit the condenser 60. The relay 68 also functions to de-energize itself so that it returns to the position shown in FIG. 5 as soon as it has performed its functions of de-energizing the relay 67, quenching the tubes 63 and 64 and discharging the condenser 60. Each of the terminals 28 is connected individually to the coil of a group of relays 69 having their contacts in parallel, any one coil of which will close its contact when the voltage on a terminal 28 exceeds a predetermined value which is chosen to correspond to a height dimension greater than any mine and hence to be ignored. The closing of the contacts of the relay 69 closes a discharge path for the condenser 60 thereby disabling the system.

Figure 5:
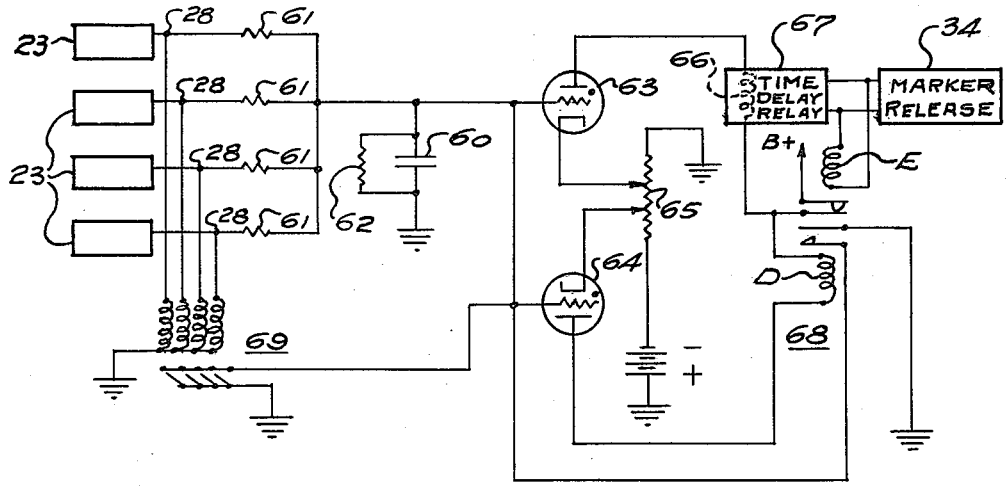
FIG. 5 represents diagrammatically a different embodiment of the invention for automatically recognizing objects having mine-like dimensions.

It will be evident from the above description that the arrangement shown in FIG. 5 discriminates against objects having a height dimension greater or less than a preselected range in which most mines are expected to fall, and discriminates against objects in the selected height range having an area greater or less than the range of areas within which most mines are expected to fall. Thus an object corresponding to curve A in FIG. 4 would be discriminated against by one of the relays 69, an object corresponding to the curve C would be discriminated against due to the values chosen for the resistances 61 and 62 and the condenser 60, and an object having a height corresponding to curve B and an area greater than a mine would be discriminated against by the action of the tube 64.

It will be appreciated that with the relatively simple circuitry employed in the embodiments represented in FIGS. 3 and 5 it is probable that some non-mine-like objects will be buoyed and that some mine-like objects will fail to be buoyed and that more sophisticated circuits can readily be devised to reduce such probability to a minimum. However, the practical utility of these systems is that they discriminate against the great majority of objects which are not mine-like.

Because of the judgment factor a skilled observer can with the arrangement shown in FIG. 2 interpret the signals produced by the devices 23 more accurately than any summation and integration circuit and this arrangement being compatible should be included along with any automatic system.

While for the purpose of disclosing the invention several preferred embodiments have been described in detail it will be understood that other embodiments and modifications will suggest themselves to those skilled in the art without departing from the scope of the invention as set forth in the appended claims.

What is claimed is:

1. A ground mine detecting apparatus comprising an elongated frame member adapted to be towed laterally at a fixed distance above and substantially parallel to the ocean floor harboring the ground mine, a plurality of rods biased toward floor engaging position and mounted in spaced relation along the length of the frame member for individual pivotal movement about an axis parallel to the frame member, a variable impedance for each of the rods and arranged to be adjusted by pivotal movement thereof, an electric circuit, means connecting the variable impedances associated with a group of adjacent rods for varying a current in the electric circuit, a utilization circuit, and means for energizing the utilization circuit whenever the current in the electric circuit is within a preselected range of values for a predetermined interval of time.

2. The apparatus defined by claim 1 including a device releasably secured to said frame member, and means responsive to the energization of said utilization circuit for releasing said device.

3. Apparatus for detecting the presence of objects on the ocean floor comprising an elongated frame member, means for supporting the frame member parallel to and a fixed distance above the ocean floor and adapted to be towed to move the frame member laterally through the ocean, a plurality of rods individually pivotally mounted in spaced relation along the frame member for swinging movement about a common axis, means for biasing the rods so that their trailing ends are urged toward the ocean floor whereby the angular positions of the rods correspond to the profile of said floor along the line of the trailing ends of said rods, means individual to each of the rods for providing electric signals representative of their respective angular positions, and a multichannel recording device connected to be actuated by said electric signals for individually marking collateral paths along a record medium whereby when said frame member is moved laterally through the ocean the markings on the record medium are visually indicative of shape, size and orientation of a bottom object encountered by said rods.

References Cited in the file of this patent

UNITED STATES PATENTS

| | | |
|---|---|---|
| 1,016,923 | Marshall | Feb. 6, 1912 |
| 1,286,156 | Vallaro | Nov. 26, 1918 |
| 2,509,185 | Eckel | May 23, 1950 |
| 2,801,410 | Youshio Ikeuchi | July 30, 1957 |
| 2,860,420 | Denman | Nov. 18, 1958 |